United States Patent [19]

Lisfeld et al.

[11] 4,166,671

[45] Sep. 4, 1979

[54] APPARATUS FOR SIMULTANEOUS ADJUSTMENT OF THE POSITION AND APERTURE OF A MICROSCOPE FIELD STOP

[75] Inventors: Robert Lisfeld, Ulmtal, Ulm; Karl Wieber, Asslar; Hans-Werner Stankewitz, Steindorf, all of Fed. Rep. of Germany

[73] Assignee: Ernst Leitz Wetzlar GmbH, Wetzlar, Fed. Rep. of Germany

[21] Appl. No.: 806,613

[22] Filed: Jun. 15, 1977

[30] Foreign Application Priority Data

Jun. 16, 1976 [DE] Fed. Rep. of Germany ....... 2626872

[51] Int. Cl.² .............................................. G02B 21/08
[52] U.S. Cl. ..................................................... 350/87
[58] Field of Search .................... 350/87, 88, 89, 17, 350/12–15, 247, 206–210, 266, 319; 354/270–274

[56] References Cited

U.S. PATENT DOCUMENTS

| 663,650 | 12/1900 | Zirngibl | 350/87 |
|---|---|---|---|
| 863,805 | 8/1907 | Ott | 350/87 |
| 3,161,717 | 12/1964 | Barabas et al. | 350/87 |
| 3,740,121 | 6/1973 | Everett | 350/247 |
| 3,922,699 | 11/1975 | Yamaki | 350/206 |

FOREIGN PATENT DOCUMENTS 713188 10/1941 Fed. Rep. of Germany ............. 350/87

*Primary Examiner*—Jon W. Henry
*Attorney, Agent, or Firm*—Schwartz, Jeffery, Schwaab, Mack, Blumenthal & Koch

[57] ABSTRACT

An apparatus for varying the position of a field stop with respect to a microscope substage illuminator includes a carrier for slidably mounting the field stop on the illuminator so as to move in a direction transverse to the optical axis of the illuminator. An annular element controlling the aperture of the field stop is pivotally mounted within the carrier and is coupled to a knurled ring projecting radially and upwardly from the diaphragm carrier. The knurled ring is in turn pivoted within the diaphragm carrier and preferably carries a circular line inscribed thereon which is concentric with the field stop in order to facilitate adjustment of the field stop.

9 Claims, 1 Drawing Figure

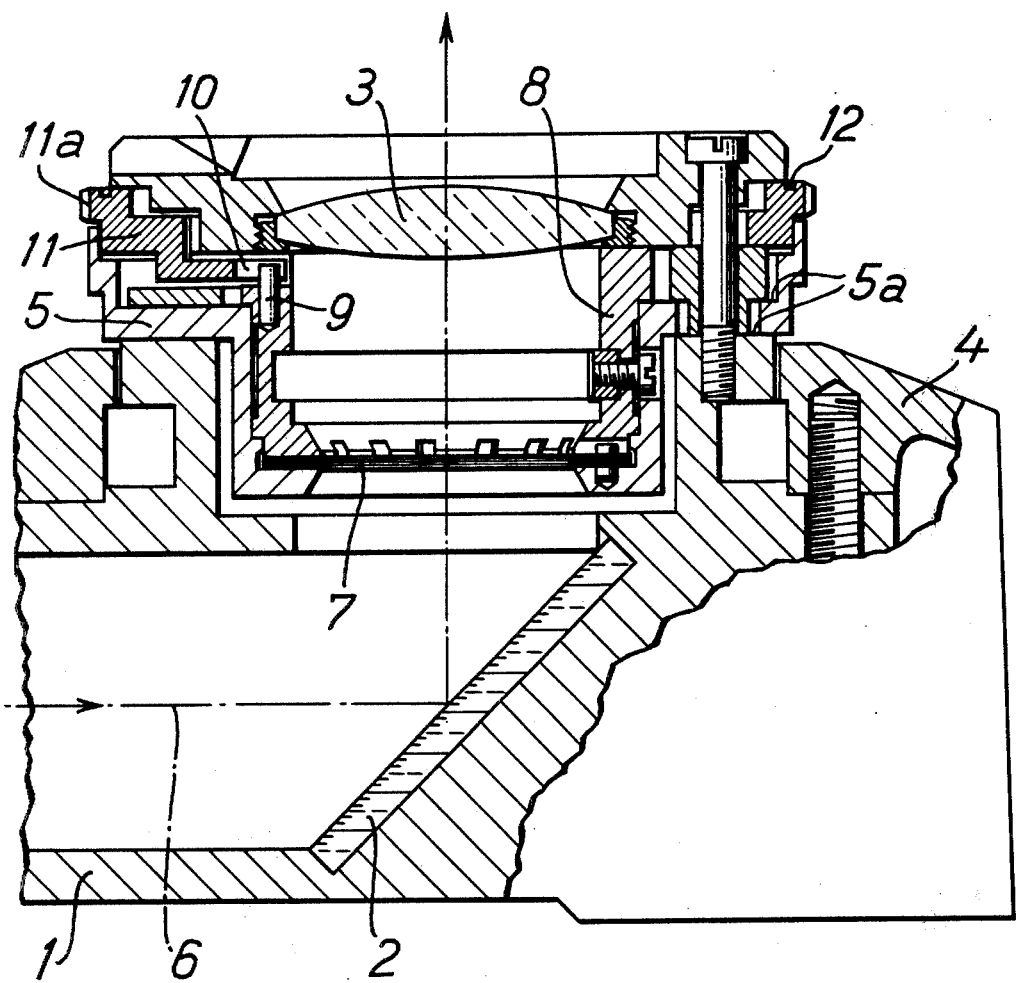

APPARATUS FOR SIMULTANEOUS ADJUSTMENT OF THE POSITION AND APERTURE OF A MICROSCOPE FIELD STOP

BACKGROUND OF THE INVENTION

This invention relates to a microscope substage-illumination illuminator with a variable field stop.

According to the rules of Kohler illumination, a variable mechanical field stop is focused into the plane of the specimen by the optical elements of an illuminator (condenser). The luminous field in the object is stopped down by means of a field stop so that it conforms to the field of view taken by the objective and viewed in the eyepiece.

Since, when observing transmitted light, illuminator and viewing means are separate components, the optical axes of both elements must be in line with one another. In particular, in the case of interchangeable condensers, adjusting means are provided by which the field stop in the specimen plane can be positioned in relation to the field of view of the observation means.

In prior art adjusting methods, one of the lenses or a tilting mirror, which focuses the field stop, is moved. However, the prior art techniques have the disadvantage of altering the optical axis of the illuminating beam's path, giving rise to what is known as oblique illumination.

New devices employing these techniques have been suggested for altering the position of the field stop in the illuminator by means of additional special adjusting means or by relocating the condenser altogether. However, since in many cases the person using the microscope must adjust the position of the field stop and its size for best possible illumination of the object field, it is inconvenient for him to operate a variety of controls independently of one another. In particular, if only minor corrections of the position of the field stop are necessary after a change of objective, he will confine himself to adjusting the size of the field stop and neglect to correct the position.

SUMMARY OF THE INVENTION

It is a principal object of the invention to provide a simple user-oriented device for centering a field stop of a microscope without altering the path of an illuminating beam.

In view of this object and other objects, the instant invention contemplates apparatus for varying the position of a field stop with respect to an optical axis of an illuminator of a microscope substage upon which the field stop is mounted wherein means are provided for slidably mounting the field stop in a direction normal to the optical axis while adjusting the aperture of the field stop.

Further, according to the instant invention, the field stop is preferably mounted in a carrier which is mounted on the illuminator for sliding relative thereto and the aperture is adjusted by an annular element which is pivotally mounted within the carrier.

In addition, the annular element is preferably coupled to a ring projecting radially from and above the carrier whereby the ring is used to move the carrier and thus the field stop. In order to position the ring with respect to the field stop, the ring includes a circular line inscribed on an upper visible surface thereof which is concentric with the field stop. Preferably, there is a frictional moment created between the carrier of the field stop and the illuminator to facilitate the manual adjustment.

BRIEF DESCRIPTION OF THE DRAWING

The drawing is a side view in elevation of a microscope substage illuminator according to the invention.

DESCRIPTION OF PREFERRED EMBODIMENT

In accordance with the principles of the invention, a microscope substage-illumination illuminator is provided with a variable field stop wherein the field stop can be moved by means of a common control device transversely to the optical axis of the illuminator while its aperture is being adjusted.

Advantageously, a diaphragm carrier is mounted in the illuminator with allowance for sliding in a direction transverse to the optical axis. An annular element controlling the aperture of the diaphragm is pivotally mounted in the diaphragm carrier and the annular element is coupled to a knurled ring projecting in radial direction over the diaphragm carrier. This knurled ring is also pivoted in the diaphragm carrier and may carry a round mark concentric with the field stop. Preferably, the seating of the diaphragm carrier in the illuminator is free from play and means may be provided to produce a certain frictional moment in the seating.

In the preferred embodiment a part of illuminator 1 comprising tilted mirror 2 and objective lens 3 is inserted in microscope base stand 4. A diaphragm carrier 5 is inserted in the space intermediate lens 3 and tilted mirror 2. The diaphragm carrier 5 is mounted on bearing areas 5a with allowance for sliding movement in a direction transverse to optical axis 6 of illuminator 1. Insertion of cup springs (not shown herein) may produce a given additional moment of friction in the seating to guard against accidental shifting of the particular position of the diaphragm carrier.

Variable diaphragm 7 is inserted in diaphragm carrier 5. Annular element 8 is pivotally mounted therein to control the aperture of diaphragm 7. Annular element 8 is coupled via pin-in-slot guide 9/10 to knurled ring 11. While a pin-in-slot connection 9/10 is shown, the element 8 may also be rigid. However, the mode shown is preferred in order to compensate for work tolerances.

Knurled ring 11, too, is pivotally mounted in diaphragm carrier 5 and its knurled head 11a overlaps diaphragm carrier 5. Turning the knurled ring 11 will open or close diaphragm 7. Pressure against the knob transversely of optical axis 6 will move diaphragm carrier 5 and, with it, the aperture of diaphragm 7 relative to the optical axis of the illuminator. Thus, the person using the microscope can also correct the position of the diaphragm in the field of view while at the same time adjusting the diaphragm aperture. In this way he can easily adapt the illumination conditions to the particular object and image conditions. The illuminating beam's path is not altered by the adjustment, so that the condenser continues to be accurately positioned even if a change of objective necessitates the readjustment of the field stop.

Knurled ring 11 is preferably provided with a circular groove 12 as a mark concentric with field stop 7. Groove 12 may be colored. The position of field stop 7 relative to the optical axis may be seen from the position of mark 12 compared to an adjacent component concentric with optical axis 6 of the illuminating device.

We claim:

1. Apparatus for use with a diaphragm having a variable aperture and forming a field stop in a microscope substage illuminator for adjusting the position and aperture of said diaphragm relative to an optical axis of said illuminator, comprising:
   (a) a diaphragm carrier for slidably mounting said diaphragm upon said illuminator for free movement thereon in a plane normal to the optical axis of said illuminator;
   (b) an annular element rotatably seated on said carrier which engages said diaphragm for adjusting the aperture of said diaphragm; and
   (c) control means frictionally mounted to said illuminator, which is both rotationally and transversely movable relative to said optical axis which engages both said carrier and said annular element for adjusting the aperture of said diaphragm upon the rotational movement thereof and the position of said diaphragm in a plane normal to said optical axis upon the transverse movement thereof, said control means maintaining a stable position by means of said frictional mounting.

2. The apparatus of claim 1, wherein said diaphragm carrier comprises an annular member which is mounted on said illuminator for sliding movement relative to said optical axis.

3. The apparatus of claim 2, wherein said annular element for adjusting the aperture of said diaphragm comprises an annular ring which is rotatably seated on said diaphragm carrier and is secured to said diaphragm.

4. The apparatus of claim 3, wherein said control means comprises a knurled ring having a first portion which is rotatably disposed within said carrier and engaged with said annular element for adjusting the aperture of said diaphragm, and a knurled shoulder portion which extends radially beyond said carrier for transversely moving said diaphragm.

5. The apparatus of claim 4, further comprising means for coupling said annular element to said knurled ring.

6. The apparatus of claim 5, wherein said coupling means comprises a pin-in-slot connection.

7. The apparatus of claim 4, wherein said knurled ring further comprises indicia defining a circular locus on the radially extending shoulder of said ring on a surface thereof.

8. The apparatus of claim 4, further comprising spring means for increasing frictional movement between said carrier and said illuminator.

9. The apparatus of claim 7, wherein said indicia is on the top surface of said radially extending shoulder.

* * * * *